United States Patent
Chen et al.

(10) Patent No.: US 8,986,890 B2
(45) Date of Patent: Mar. 24, 2015

(54) CATHODAL MATERIALS FOR LITHIUM CELLS

(75) Inventors: Jin-Ming Chen, Taoyuan (TW);
Chia-Haw Hsu, Yunlin County (TW);
Yu-Run Lin, Changhua County (TW);
Mei-Hui Hsiao, Hualien County (TW);
Tu Chen, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 816 days.

(21) Appl. No.: 12/102,319

(22) Filed: Apr. 14, 2008

(65) Prior Publication Data
US 2009/0170003 A1    Jul. 2, 2009

(30) Foreign Application Priority Data
Dec. 27, 2007   (TW) ............................. 96150514 A (51) Int. Cl.
| | |
|---|---|
| H01M 4/131 | (2010.01) |
| H01M 4/485 | (2010.01) |
| H01M 4/505 | (2010.01) |
| H01M 4/525 | (2010.01) |
| H01M 4/62 | (2006.01) |
| H01M 10/0525 | (2010.01) |
| H01M 4/04 | (2006.01) |
| H01M 4/58 | (2010.01) |
| H01M 4/02 | (2006.01) |

(52) U.S. Cl.
CPC ............ *H01M 4/0471* (2013.01); *H01M 4/505* (2013.01); *H01M 4/525* (2013.01); *H01M 4/5825* (2013.01); *H01M 10/0525* (2013.01); *H01M 2004/021* (2013.01); *Y02E 60/122* (2013.01)

USPC .......... 429/232; 429/221; 429/223; 429/224; 429/231.3; 429/231.5; 429/231.95

(58) Field of Classification Search
USPC ................. 429/231.5, 231.95, 221, 223, 224, 429/231.3, 232
See application file for complete search history.

(56) References Cited

U.S. PATENT DOCUMENTS

| 6,558,847 B1 | 5/2003 | Kawakami et al. |
| 6,679,926 B1 | 1/2004 | Kajiura et al. |

(Continued)

FOREIGN PATENT DOCUMENTS

| CA | 2334386 | 10/2000 |
| CA | 2569991 A1 | 6/2008 |

(Continued)

OTHER PUBLICATIONS

Umeno et al., Machine translation of JP 2006302671 A, Nov. 2006.*

(Continued)

*Primary Examiner* — Sean P Cullen (57) ABSTRACT

A cathodal material for lithium cells comprises a porous lithium oxide microparticle is provided. The porous lithium oxide microparticle comprises a plurality of porous lithium oxide nanoparticles formed with a first conductive layer therein, a pore defined by connecting the lithium oxide nanoparticles, a second conductive layer covering at least a surface of one of the lithium oxide nanoparticles contacting the first conductive layer and forming a three-dimensional conductive network between the lithium oxide nanoparticles, and a conductive fiber connecting with the second conductive layer.

13 Claims, 10 Drawing Sheets

(56) References Cited

U.S. PATENT DOCUMENTS

| | | | |
|---|---|---|---|
| 6,855,273 | B2 | 2/2005 | Ravet et al. |
| 6,962,666 | B2 | 11/2005 | Ravet et al. |
| 2004/0033360 | A1 | 2/2004 | Armand et al. |
| 2004/0131934 | A1* | 7/2004 | Sugnaux et al. ............ 429/209 |
| 2006/0141361 | A1 | 6/2006 | Yuasa et al. |
| 2009/0123837 | A1* | 5/2009 | Gratzel et al. ............. 429/209 |
| 2009/0155691 | A1* | 6/2009 | Park et al. ................. 429/223 |
| 2010/0323245 | A1* | 12/2010 | Liang ....................... 429/231.5 |

FOREIGN PATENT DOCUMENTS

| | | | |
|---|---|---|---|
| CN | 1787259 | A | 6/2006 |
| CN | 1848493 | A | 10/2006 |
| CN | 101009368 | | 8/2007 |
| CN | 101047242 | A * | 10/2007 |
| JP | 2006-164859 | | 6/2006 |
| JP | 2006302671 | A | 11/2006 |
| JP | 2007-048692 | | 2/2007 |
| KR | 1020060067002 | A | 6/2006 |
| WO | WO 2007/100918 | A2 | 9/2007 |
| WO | WO 2008/067677 | A | 6/2008 |
| WO | WO 2008/067677 | A1 | 6/2008 |

OTHER PUBLICATIONS

An et al., Machine translation of CN 101047242 A, Oct. 2007.*
Fei Gao et al., "Preparation and Characterization of Nano-Particle LiFePO4 and LiFePO4/C by Spray-Drying and Post-Annealing Method," Electrochimica Acta 53, 2007, p. 1939-1944, Elsevier Ltd. US.
Miran Gaberscek et al., "Porous, Carbon-Decorated LiFePO4 Prepared by Sol-Gel Method Based on Citric Acid," Solid State Ionics 176, 2005, p. 1801-1805, Elsevier, US.
Office Action, Canadian Patent Office, Serial No. CA 2,569,991, Dec. 17, 2010.
Office Action, Korean Patent Office, Serial No. 10-2008-0121401, Nov. 23, 2010.
Office Communication pursuant to article 94(3) EPC, Application No. 08 020 108.0-1227, European Patent Office, Oct. 11, 2010, Netherlands.
China Patent Office, Office Action, Patent Application Serial No. 201110415450.3, Jun. 24, 2013, China.
Canadian Intellectual Property Office, Office Action, Patent Application Serial No. 2,644,302, Jan. 4, 2013, Canada.
Korea Patent Office, Notice of Allowance, Patent Application Serial No. 10-2008-0121401, Sep. 30, 2011, Korea.
Japan Patent Office, Office Action, Patent Application Serial No. 2008-334866, Oct. 25, 2011, Japan.

* cited by examiner

CATHODAL MATERIALS FOR LITHIUM CELLS

BACKGROUND OF THE INVENTION

1. Field of the Invention

The present invention relates to electrode materials and in particular to cathodal materials for lithium cells.

2. Description of the Related Art

Lithium cells are a kind of secondary cells (rechargeable cells) mainly composed of a cathode of lithium alloy oxide, a liquid organic electrolyte solution/solid electrolyte, and an anode of carbon material. The lithium cells are mainly used in computers, communication, and consumer electronic (3C) product applications such as cell phones, laptop computers, digital cameras, and video cameras to provide high power density.

Nevertheless, the lithium alloy oxide of the cathodal material in the lithium cell has a low conductivity problem and has an insufficient potential thereof during the discharging of high current, thereby degrading charge/discharge ability and product lifespan during high current operations. Therefore, lithium secondary cells are seldom used in higher powered applications such as electrical vehicles and hand tools since the products require a higher current when compared to 3 C products.

Thus, a cathodal material with improved conductivity is needed to increase product lifespan and charge/discharge ability of lithium secondary cells, thereby increasing usage in higher powered applications.

BRIEF SUMMARY OF THE INVENTION

Cathodal materials for lithium secondary cells, methods for fabricating the same and lithium secondary cells using the same are provided.

An exemplary cathodal material for lithium cells comprises a porous lithium metal oxide microparticle. The porous lithium metal oxide microparticle comprises a plurality of porous lithium metal oxide nanoparticles formed with a first conductive layer therein, a pore defined by connecting the lithium metal oxide nanoparticles, a second conductive layer covering at least a surface of one of the lithium metal oxide nanoparticles contacting the first conductive layer and forming a three-dimensional conductive network between the lithium metal oxide nanoparticles, and a conductive fiber connecting with the second conductive layer.

An exemplary method for fabricating a cathodal material comprises providing a mixed powder comprised of lithium ion precursors, phosphate precursors and iron ion precursors, wherein the mixed powder comprises a plurality of porous nanoparticles. The mixed powder is mixed with water to form the first slurry. The first slurry is granulated and sintered to form the first sphere-like precursor. The first sphere-like precursor is mixed with conductive materials and water to form the second slurry. The second slurry is granulated and sintered to form a plurality of porous lithium metal oxide nanoparticles. The porous lithium metal oxide nanoparticles are mixed with a conductive carbon and a binder to form the cathodal material.

An exemplary lithium secondary cell comprises a cathode, an anode, and an ion-conducting layer sandwiched between the cathode and the anode. In an embodiment, the cathode comprises the previously mentioned cathodal materials.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
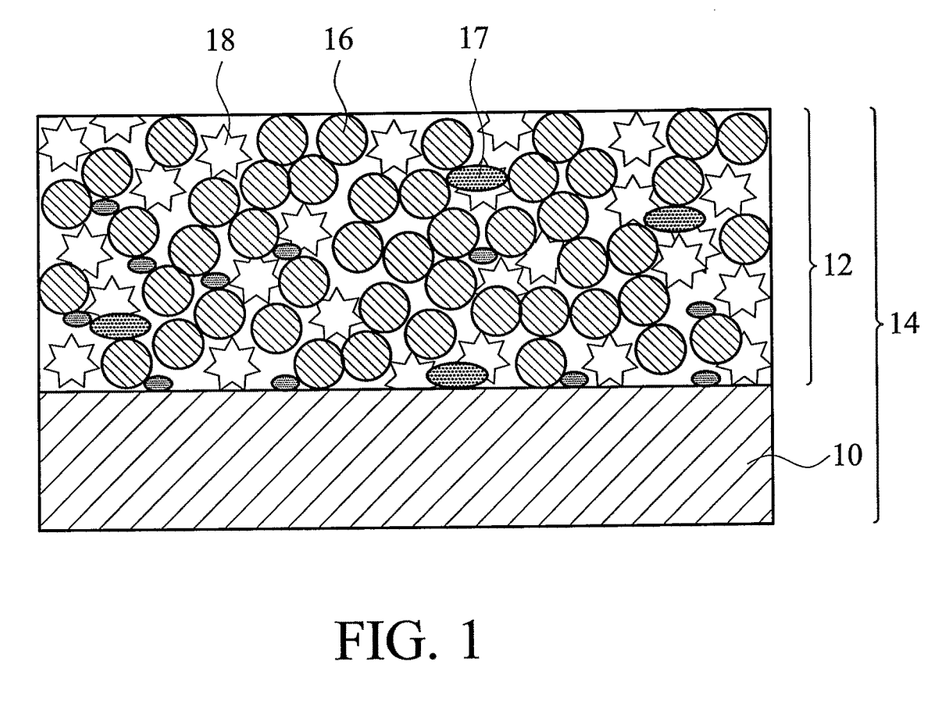
FIG. 1 is a schematic diagram showing a cross section of a cathode plate structure of a lithium secondary cell according to an embodiment of the invention.

Referring to FIG. 1, a schematic cross section of an exemplary cathode plate structure 14 is illustrated. The cathode plate structure 14 includes a cathode material layer 12 coated over a collecting plate 10. The collecting plate 10 is for electron collecting and can be a plate comprised of aluminum, aluminum/carbon, and nano-aluminum/aluminum. The cathode material layer 12 includes lithium metal oxide 16, conductive carbon material 17 and binder 18, having a weight ratio of about 93:3:4~75:10:15 therebetween.

Figure 2:
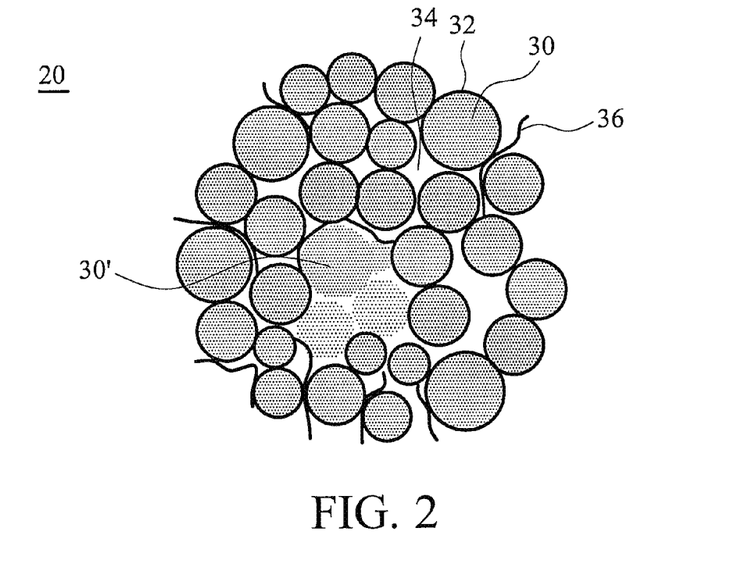
FIG. 2 is a schematic diagram showing a structure of a cathodal material according to an embodiment of the invention.

Referring to FIG. 2, a schematic diagram of an exemplary structure of a porous lithium metal oxide microparticle 20 within the lithium metal oxide 16 is illustrated. The lithium metal oxide 16 is formed by granulating a plurality of the lithium metal oxide microparticles 20. The lithium metal oxide microparticles 20 have an average diameter of about 5-20 µm, a surface area of about 1-50 $m^2$/g, and a porosity of about 0.02-0.12 c.c./g.

As shown in FIG. 2, only a porous lithium metal oxide microparticle 20 is illustrated, for simplicity, and the porous lithium metal oxide microparticle 20 includes a plurality of porous lithium metal oxide nanoparticles 30. The porous lithium metal oxide nanoparticles 30 have an average diameter of about 100-500 nm.

The porous lithium metal oxide nanoparticles 30 are connected with each and defined with a plurality of pores 34 therebetween. The pores 34 are formed in an ordered or non-ordered configuration and have a dimension of about 10-30 nanometers, thus providing wetting locations for the electrolytes and reaction areas for electrochemical reaction during operation of a lithium secondary cell, thereby increasing ion conductivity speed therein.

In addition, a conductive layer 32 is further provided over a surface of most of the porous lithium metal oxide nanoparticles 30. The porous lithium metal oxide nanoparticles 30 in the porous lithium metal oxide microparticle 20 which are not covered by the conductive layer 32 are entitled as 30' in FIG. 2. Moreover, a plurality of conductive fibers 36 is further provided within the porous lithium metal oxide microparticle 20 and is connected with the conductive layer 32. The conductive fibers 36 may protrude over a surface of the porous lithium metal oxide microparticle 20 and/or may extend into the pores 34 between the porous lithium metal oxide nanoparticle 30/30' to further connect with the porous lithium metal oxide nanoparticle 30/30' formed inside the porous lithium metal oxide microparticle 20. The conductive layer 32 may include metal, conductive organic materials or conductive inorganic materials (e.g. conductive carbon) and has thickness of about 3~10 nanometers. The conductive fibers 36 may include metal, conductive organic materials or conductive inorganic materials (e.g. conductive carbon) and have an average diameter of about 0.5~3 micrometers. Thus, through the conductive layer 32 and the conductive fibers and possible connections thereof, a three dimensional (3D) conductive network is formed within the porous lithium metal oxide microparticle 20, which benefits electron conduction.

Figure 3:
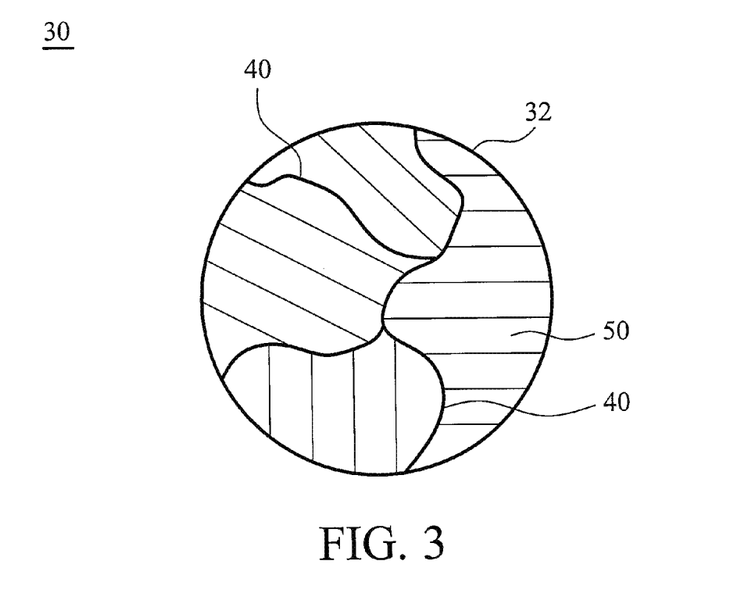
FIG. 3 is a schematic diagram showing a structure of conductive particles of the cathodal material shown in FIG. 2.

Referring to FIG. 3, a schematic diagram showing an exemplary porous lithium metal oxide nanoparticle 30 within the porous lithium metal oxide microparticle 30 of FIG. 2 is illustrated. As shown in FIG. 3, the porous lithium metal oxide nanoparticle 30 is covered with the conductive layer 32 on its surface and the porous lithium metal oxide nanoparticle 30 includes a plurality of pores (not shown) defined by a plurality of nanocrystals 50 of the lithium metal oxide. A conductive layer 40 is provided between the nanocrystals 50 and the conductive layer 40 contacting with the conductive layer 32 and is connected thereto. The nanocrystals 50 within the porous lithium metal oxide nanoparticle 30 is formed with an average diameter of about 10~100 nm. Thus, through the formation and connections of the conductive layer 40 and 32, a three dimensional conductive network can be formed in the porous lithium metal oxide nanoparticle 30, thereby improving electron conduction therein.

Figure 4A:
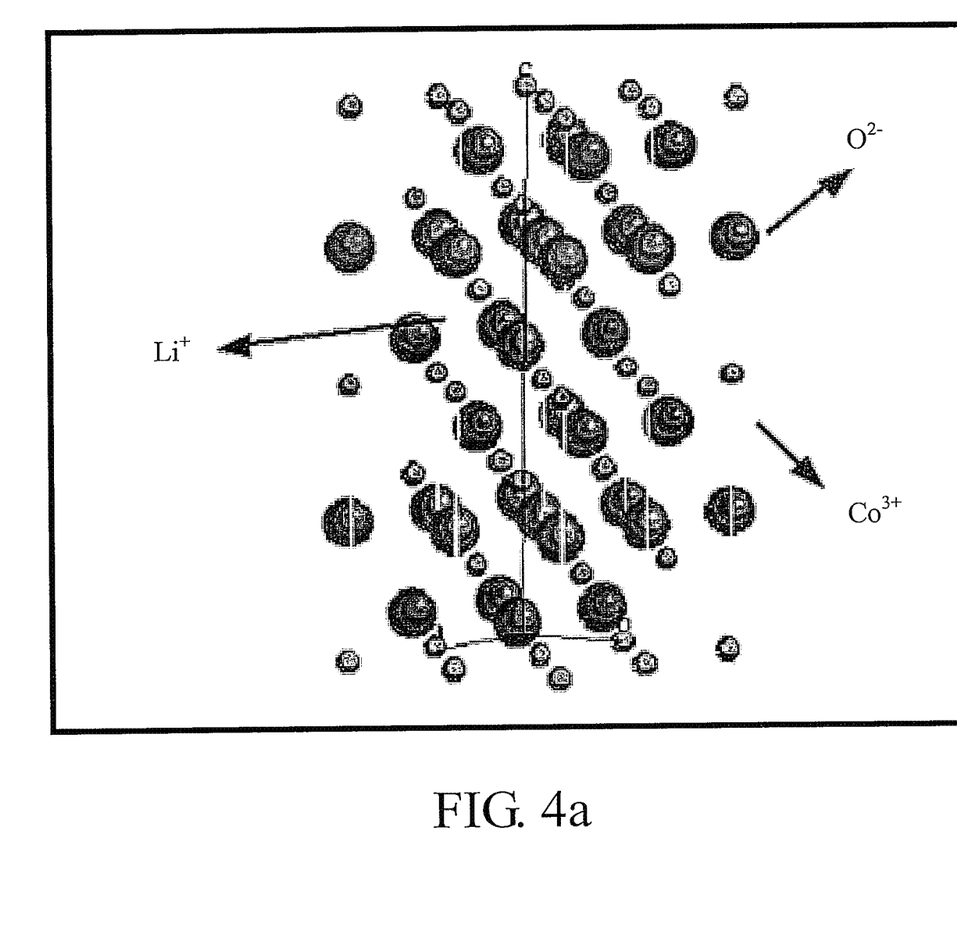
FIGS. 4a, 4b and 4c are schematic diagrams showing grain structures according to various embodiments of the invention, respectively.
Figure 4B:
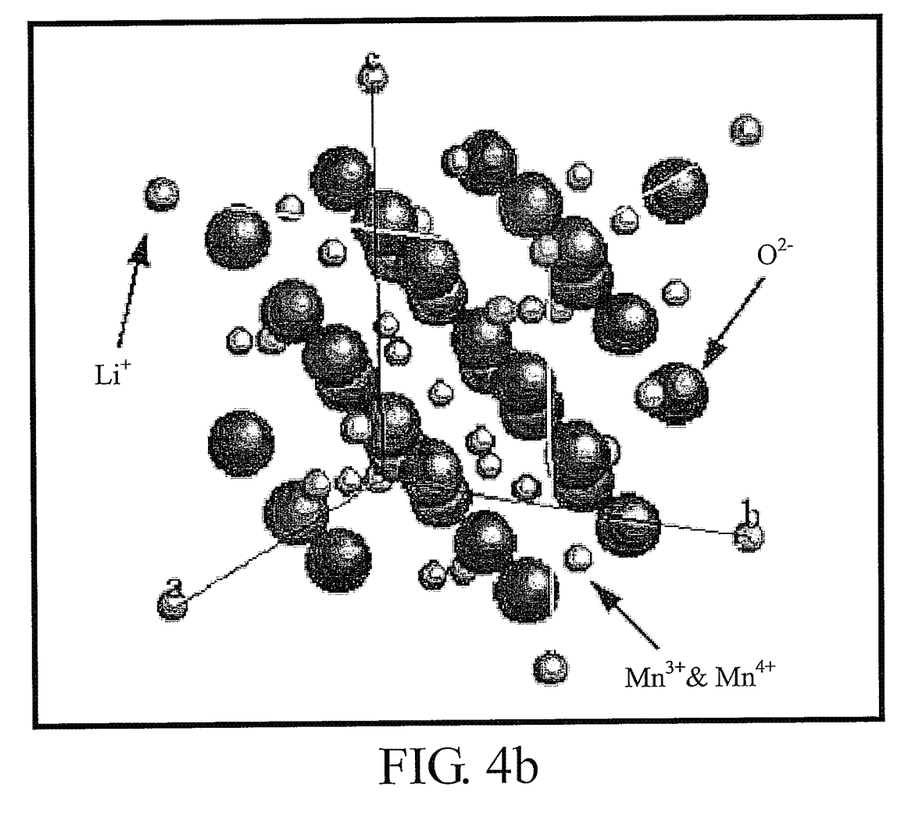
Figure 4C:
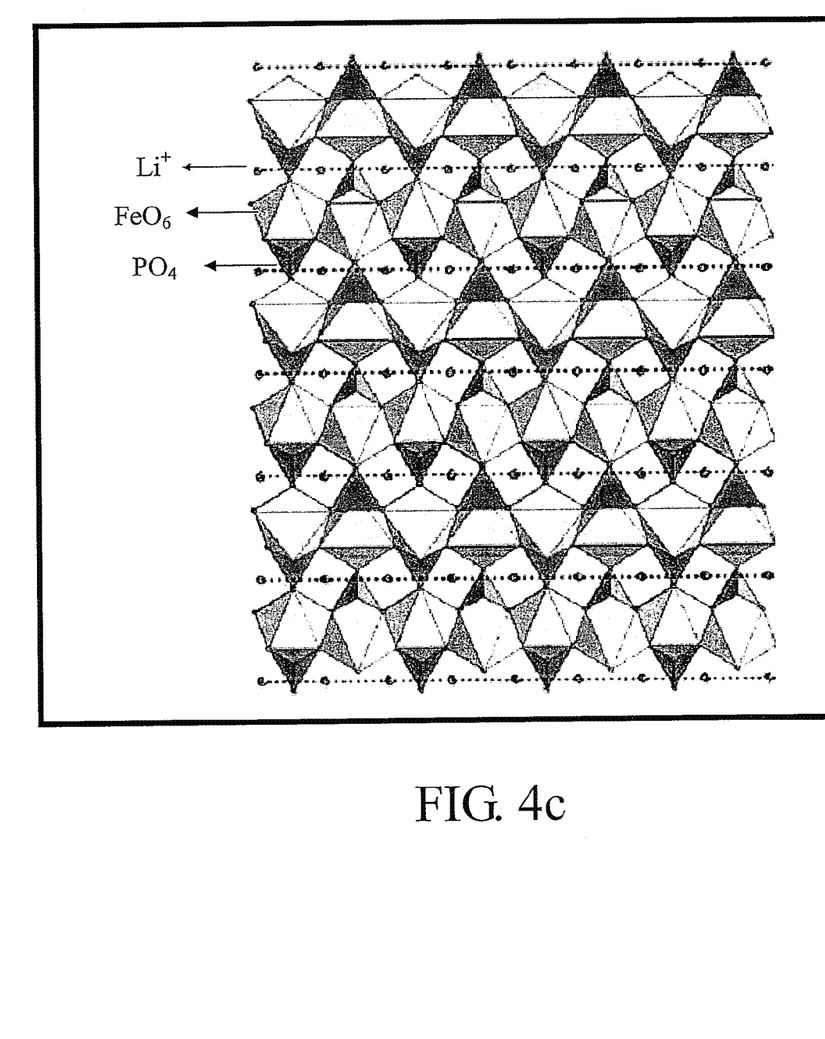

The nanocrystals 50 of the lithium metal oxide powder may include lithium metal oxide of a layered structure, spinel structure or olivine structure. The lithium metal oxide of a layered structure may be, for example, $LiCoO_2$, $LiNiO_2$, $LiMnO_2$ or $LiCo_xNi_yMn_zO_2$ (x+y+z=1). FIG. 4a is a schematic diagram showing a layered structure comprised of $LiCoO_2$ nanocrystal. The lithium metal oxide of a spinel structure may be, for example, $Li_2Ti_5O_8$ or $LiMn_2O_4$ and FIG. 4b illustrates a spinel structure of $LiMn_2O_4$ nanocrystal. The nanocrystal 50 of an olivine structure may be, for example, $LiFePO_4/C$, $LiFePO_4$, or $Li_xM_{1-(d+t+q+r)}D_dT_tQ_qR_r$ $(XO_4)$, wherein M is selected from the group consisting of Fe, Mn, Co, Ti, Ni and mixtures thereof, D is selected from the group consisting of $Mg^{2+}$, $Ni^{2+}$, $Co^{2+}$, $Zn^{2+}$, $Cu^{2+}$ and $Ti^{2+}$, T is selected from the group consisting of $Al^{3+}$, $Ti^{3+}$, $Cr^{3+}$, $Fe^{3+}$, $Mn^{3+}$, $Ga^{3+}$, $Zn^{3+}$ and $V^{3+}$, Q is selected from the group consisting of $Ti^{4+}$, $Ge^{4+}$, $Sn^{4+}$ and $V^{4+}$, R is selected from the group consisting of $V^{5+}$, $Nb^{5+}$ and $Ta^{5+}$, X is selected from the group consisting of Si, S, P, V and mixtures thereof, and $0 \leq x \leq 1$, $0 \leq d, t, q, r \leq 1$ and at least one of d, t, q and r has a value other than zero. FIG. 4c is a schematic diagram showing an olivine structure of $LiFePO_4$.

Figure 5:
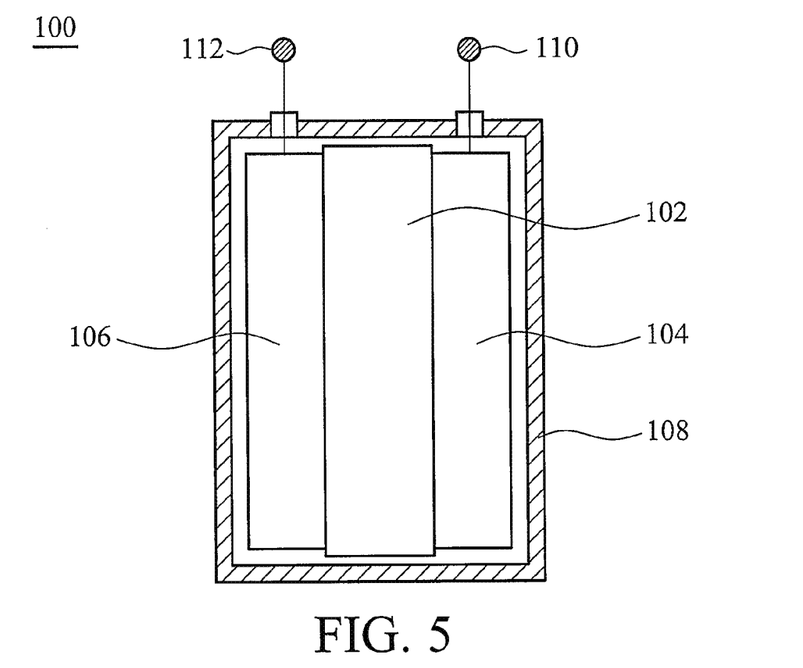
FIG. 5 is a schematic diagram showing a lithium secondary cell according to an embodiment of the invention.

FIG. 5 is a schematic diagram showing an exemplary embodiment of a lithium secondary cell 100 with a column configuration, including an oppositely disposed anode 106 and cathode 104. The anode 106 and the cathode 104 are isolated by an ionic conductor layer 102. The anode 106, the cathode 104 and the ionic conductor layer 102 are encapsulated by a housing 108, and the cathode 104 and the anode 106 are respectively connected with an anode terminal 112 and a cathode terminal 110. In the lithium secondary battery as shown in FIG. 5, the cathode 104 uses the cathodal material layer 12 as shown in FIG. 1 and the anode 106 includes materials such as carbon, graphite, mesocarbon microbeads (MCMB) or lithium, and the ionic conductor layer 102 includes lithium containing insulating films or gel electrolytes. By using the cathodal material layer 12 of the invention, the lithium secondary cell 100 is capable of high charge/discharge powered product applications.

Figure 6:
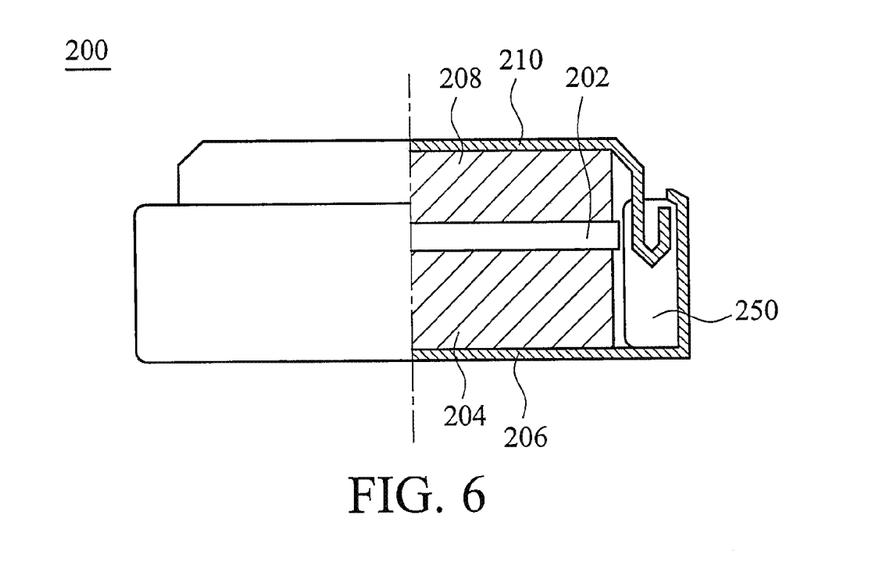
FIG. 6 is a schematic diagram showing a lithium secondary cell according to another embodiment of the invention.

FIG. 6 is a schematic diagram showing another exemplary lithium secondary cell 200, having a coin configuration. The lithium secondary cell includes a cathode 204 of a cathodal material layer and an anode 208 of an anode material layer. The cathode 204 is stacked and disposed over the anode 208, and an ionic conductor layer 202 is sandwiched between the anode 208 and the cathode 204. The stacked anode 208, the ionic conductor layer 202 and the cathode layer 204 are encapsulated by a cathodal case 206 at the cathodal side and by an anode case 210 at the anode side. The cathodal case 206 and the anode case 210 can function as a cathode terminal and an anode terminal, respectively. Herein, a gasket 250 is embedded within a part of the cathodal case 206 to prevent the material in the lithium secondary cell 200 from leaking.

In the lithium secondary battery as shown in FIG. 6, the cathode 204 uses the cathodal material layer 12 as shown in FIG. 1 and the anode 208 includes materials such as carbon, graphite, mesocarbon microbeads (MCMB) or lithium, and the ionic conductor layer 202 includes lithium containing insulating films or gel electrolytes. By using the cathodal material layer 12 of the invention, the lithium secondary cell 200 is capable high charge/discharge powered product applications.

In addition, an exemplary method for fabricating a cathodal material is provided, including the following steps:

(a) A mixed powders of ion precursors including, for example, LiOH, $Li_2O_3$ or $C_2H_5COOLi$, phosphate precursors including, for example, $(NH_4)_2HPO_4$, $NH_4H_2PO_4$, $H_3PO_4$ or $(NH_4)_3PO_4$, and iron ion precursors including, for example, $FeC_2O_4 \times 2H_2O$, Fe, $Fe_2(C_2O_4)_3$ or $Fe(C_2H_5COO)_2$ are first provided. The provided mixed powders include a plurality of porous nanoparticles;

(b) The mixed powder is then mixed with water to form a first slurry, wherein the above precursors in the mixed powder are mixed in a ratio of about 1:1:1 (mole ratio);

(c) The first slurry is then granulated and sintered to form a first sphere-like precursor;

(d) The first sphere-like precursor is then mixed with conductive materials and water to form a second slurry;

(e) The second slurry is then granulated and sintered to form a plurality of porous lithium metal oxide nanoparticles; and (f) The porous lithium metal oxide nanoparticles are then mixed with a conductive carbon and a binder to form the cathodal material applicable for a cathode plate structure for lithium cells.

In the above steps, the precursors powders and the water in the first slurry in step (b) are mixed in a ratio of about 20:80~60:40 (wt %). The first sphere-like precursor, the conductive carbon and the water in the second slurry are mixed in a proportion of about 46:4:50~40:10:50 (wt %) in step (d). The porous lithium metal oxide microparticles, the conductive carbon and the binder in step (f) are mixed in a proportion of about 93:3:4~75:10:15 (wt %) and the formed cathodal material is then coated over a collector (e.g. an aluminum foil) to form a cathode electrode plate for a lithium secondary cell.

In an embodiment, the conductive powders in step (d) can be, for example, metal, conductive organic material or conductive inorganic materials (e.g. conductive carbon), such as conductive carbon powders or metal powders.

Moreover, in an embodiment, the first sphere-like precursors are formed by a single-step spray thermal separation method or by a two-step method including a spray drying process and a sintering process. The granulation and sintering in step (c) can be performed under a temperature of about 200-400° C. and the granulation and sintering in step (e) can be performed under a temperature of about 600-850° C.

Example 1

First, a 750 g precursor powder was provided and stirred and mixed with 750 g of water, thereby forming the first slurry. The first slurry was granulated and sintered to form a first sphere-like precursor with a powdered configuration. The first slurry can be granulated and sintered in a single step process including thermal spray separation or in a two-step process including a spray-drying step followed by a sintering step. The first slurry can be granulated and sintered under a temperature of about 250° C.

Next, 100 g of the first sphere-like precursor was provided and mixed with 6 g of conductive material and 100 g of solvent, thereby forming the second slurry. The second slurry was granulated and sintered under a temperature of about 600~850° C., thereby forming lithium iron phosphate cathodal materials having a plurality of porous microparticles. The lithium iron phosphate cathodal material was formed with porous microparticles similar to the lithium iron phosphate cathodal material illustrated in FIG. 1 and the conductive material can be, for example, conductive carbon.

The above lithium iron phosphate cathodal material was then mixed with conductive carbon and polyvinylidene in a weight ratio of about 84:7:9 and a predetermined amount of N-Methyl-2-Pyrrolidone (NMP) was then provided and mixed therewith, thereby forming a third slurry. The third slurry was then coated on an aluminum foil with a thickness of about 20 micrometers a by a scraper of 120 micrometers. The aluminum foil with the third slurry coated thereon was then heated and dried by, for example, a vacuum drying process to remove the NMP solvent, thereby forming a cathode plate.

The above electrode plate was next grinded to form a coin shaped electrode plate with a diameter of about 12 mm and used a lithium metal as an anode. A coin-shape cell was then obtained by composing the above coin shaped electrode plate, as a cathode, and an electrolyte solution including $LiPF_6$ (1 M), ethylene carbonate (EC), and diethyl carbonate (DEC) was mixed in a ratio of about 3:5:2.

Comparative Example 1

For the comparative example, the lithium iron phosphate cathodal material and manufacturing method thereof were the same with that described in the above example. However, no conductive material was provided during formation of the lithium iron phosphate cathode material for the comparative example, thereby obtaining a comparative lithium iron phosphate cathodal material without a 3D conductive network therein.

The above comparative lithium iron phosphate cathodal material was then provided and a comparative coin-shaped cell was formed by the same fabricating steps described in the above example except that no conductive material was provided during fabrication thereof.

Figure 7:
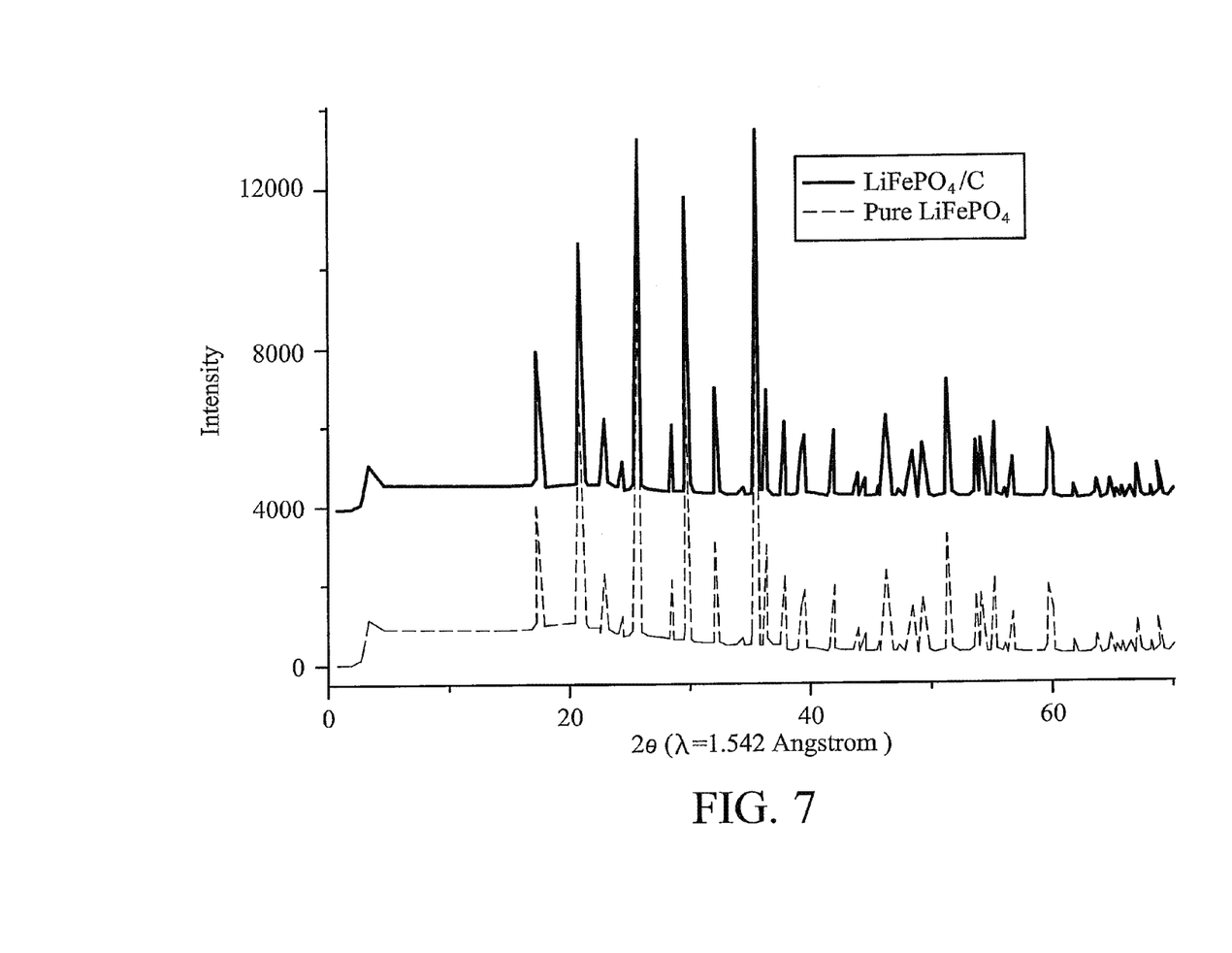
FIG. 7 is a diagram showing an X-ray diffraction analysis result of a cathodal material according to an embodiment of the invention.

FIG. 7 is a diagram showing an X-ray diffraction analysis result of a cathodal material according to an embodiment of the invention, respective showing X-ray diffraction analysis results of the example 1 and the comparative example 1. As shown in FIG. 7, the X-ray diffraction analysis results of the cathodal material of the example 1 and the comparative example 1 show similar profiles but with differences in strength levels therebetween. The results thereby show that the lithium iron phosphate structures of the cathodal material in the example 1 and the comparative example 1 hold an olivine structure and crystalline structure therein and are not changed by the process disclosed in example 1.

Meanwhile, the following table 1 shows examined physical characteristics of the lithium iron phosphate in the example 1 and the comparative example 1.

TABLE 1

Physical characteristics of lithium iron phosphate.

| testings | Carbon content (wt %) | tap density (g/c.c.) | true density (g/c.c.) | tap resistance ($\Omega$) | plate resistance (m$\Omega$) | BET surface area (m$^2$/g) | BET average pore diameter (nm) | BJH single point total pore volume (c.c/g) |
|---|---|---|---|---|---|---|---|---|
| Example | 2~3 | 0.79 | 3.31 | 0.67K | 0.67 | 30.3 | 2.06 | 0.06 |
| Comparative example | 0 | 0.65 | 3.59 | $2 * 10^9$ | 1.57 | 14.61 | 2.06 | 0.03 |

As shown in Table 1, the lithium iron phosphate in the comparative example 1 showed a true density of 3.59 g/c.c and a tap density of 0.65 g/c.c. A zero carbon content was examined therein, showing no carbon forming over a surface of the lithium iron phosphate in the comparative example 1. A sheet resistance was not examined by 4-points testing and the data in table 1 is data described in Solid State Ionics 176 (2005), 1801. An ingot resistance thereof was 109$\Omega$ and a plate resistance thereof was 1.57 m$\Omega$. Moreover, a surface area per gram of the lithium iron phosphate in the comparative example 1 was 14.61 cm$^2$/g (measured by a BET method), wherein a porous diameter of 2.06 nm and a porosity of 0.03 c.c/g thereof were measured.

As shown in table 1, the lithium iron phosphate in the example showed a true density of 3.31 g/c.c and a tap density of 0.79 g/c.c. A carbon content of about 2~3% was examined therein, showing carbon materials forming over a surface of the lithium iron phosphate in the example 1. A sheet resistance of 0.67 kΩ was examined by 4-points testing. A plate resistance thereof was 0.67 mΩ. Moreover, a surface area per gram of the lithium iron phosphate in the example 1 was 30.3 cm$^2$/g (measured by a BET method), wherein a porous diameter of 2.06 nm and a porosity of 0.06 c.c/g thereof were measured.

When referring to the table 1 and comparisons described above, the modified lithium iron phosphate in the example 1 had increased surface area, reduced diameter, reduced resistance and better conductive material coverage. The results thereby benefit electron conductivity of the lithium iron phosphate structure thereof and improve diffusion path for the lithium ions, making ion conduction therein easier while filling the electrolyte solution in the pores therein, and increasing reaction surfaces and reaction opportunity through increased surface area.

Figure 8:
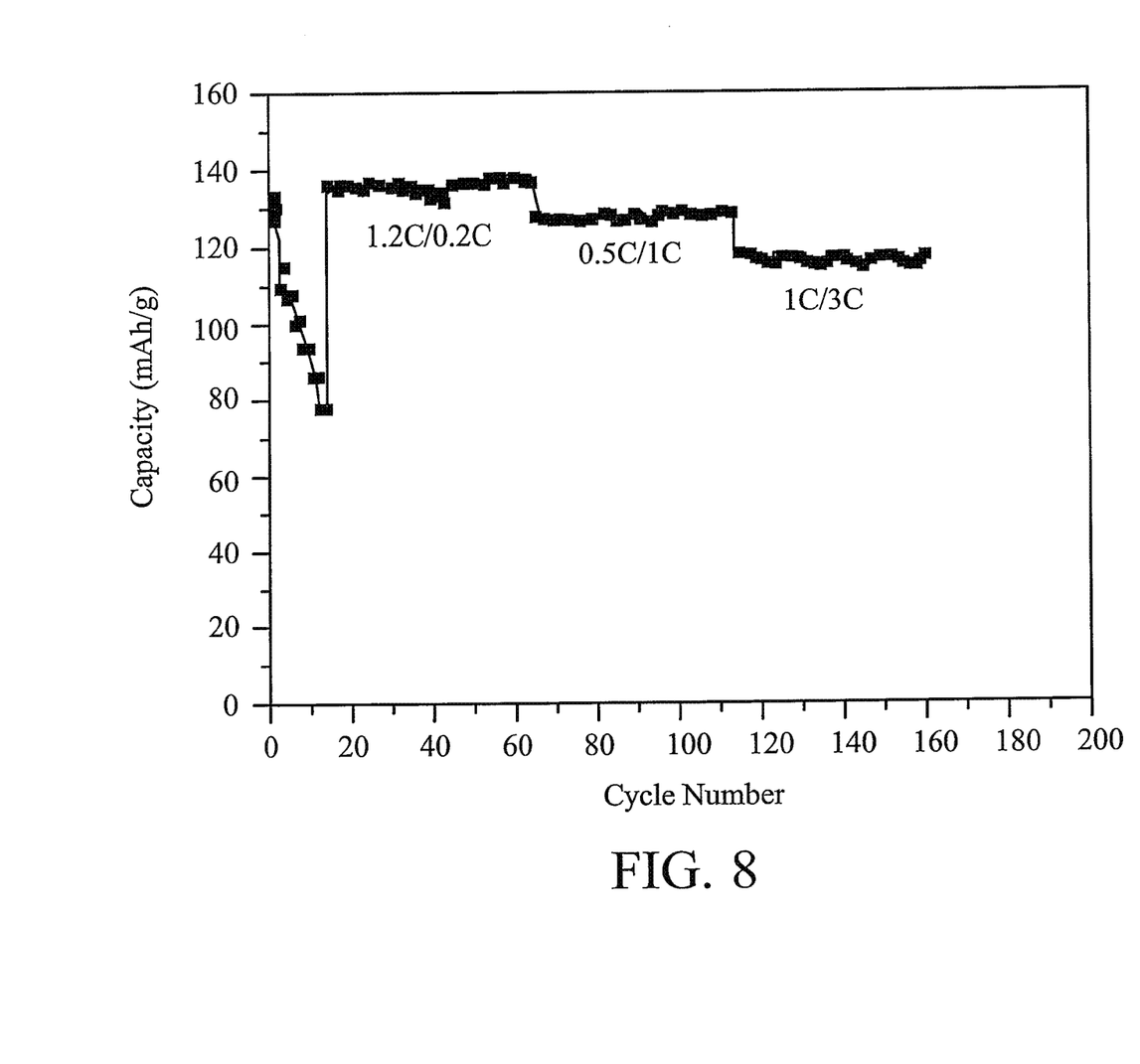
FIG. 8 is a diagram showing an electrical chemistry analysis result of a cathodal material according to an embodiment of the invention.

FIG. 8 is a diagram showing an electrical chemistry analysis result of a cathodal material according to an embodiment of the invention, showing a charge/discharge profile of the lithium secondary cell of example 1. As shown in FIG. 8, the lithium secondary cell was discharged under conditions of 0.1 C, 0.2 C, 1 C, 3 C, 5 C, 8 C, and 12 C. The lithium secondary cell was tested for 50 cycles under a condition of 0.2 C/0.2 C (charge/discharge) and a remaining capacity of 140 mAh/g was obtained. Next, the lithium secondary cell was tested for 50 cycles under a condition of 0.5 C/0.1 C (charge/discharge) and a remaining capacity of 132 mAh/g was obtained. Moreover, the lithium secondary cell was tested for 50 cycles under a condition of 1 C/3 C (charge/discharge) and a remaining capacity of 121 mAh/g was obtained. Thus, the lithium secondary cell composed of the cathodal material having the porous lithium metal oxide micorparticles provided greater performances.

Figure 9:
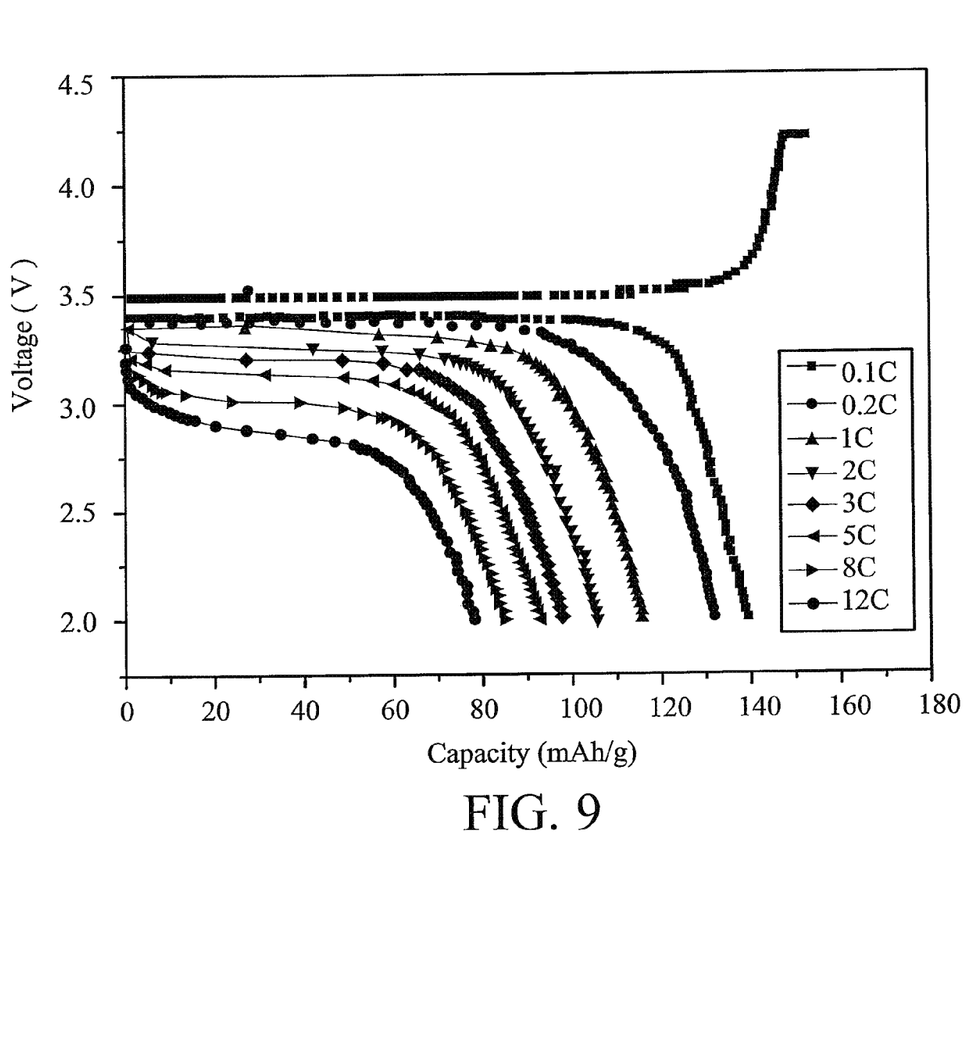
FIG. 9 is a diagram showing an electrical chemistry analysis result of a cathodal material according to an embodiment of the invention.
Figure 10:
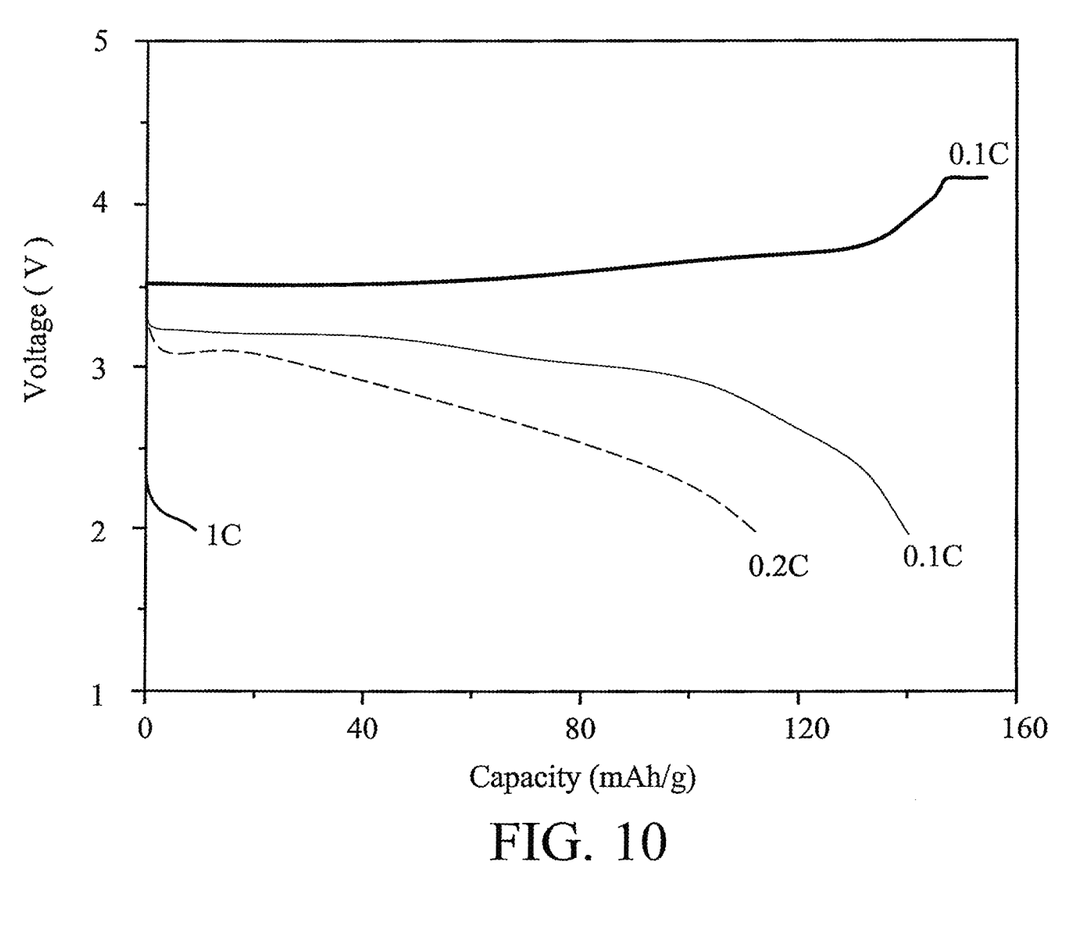
FIG. 10 is a diagram showing an electrical chemistry analysis result of a cathodal material according to a comparative embodiment of the invention.

FIG. 9 and FIG. 10 are diagrams showing an electrical chemistry analysis result of a cathodal material according to an embodiment of the invention, respectively showing a charge/discharge profile of the lithium secondary cell in the example 1 and the comparative example 1.

As shown in FIG. 9, the lithium secondary cell in example 1 was first charged and discharged under a condition of 0.1 C and a capacity of about 152/141 (charge/discharge) mAh/g was obtained, showing an irreversible amount of 11 mAh/g (about 7.3% loss), and a capacity of about 132 mAh/g remained while the lithium secondary cell of the example 1 was discharged under a condition of 0.2 C, thus showing a 9 mAh/g loss under a 0.1 C discharge rate. The lithium secondary cell of the example 1 showed a capacity of about 100 mAh/g under a 3 C discharge rate and a capacity of about 80 mAh/g under a 12 C discharge rate.

As shown in FIG. 10, the lithium secondary cell in the comparative examples first charged and discharged under a condition of 0.1 C and a capacity of about 155/141 (charge/discharge) mAh/g was obtained, showing an irreversible amount of 14 mAh/g (about 9% loss), and a capacity of about 118 mAh/g remained while the lithium secondary cell of the comparative example was discharged under a condition of 0.2 C. The lithium secondary cell of the comparative example 1 showed a remaining capacity of about 17 mAh/g under a 1 C discharge rate.

When referring to the comparisons illustrated in FIGS. 9 and 10, the lithium second cell without the lithium iron phosphate material of the invention (the comparative example 1) showed that the lithium iron phosphate cathodal materials therein did not benefit high current discharge conditions as shown by the electrical chemistry analysis in FIG. 10, thereby degrading possible high powered product applications. Meanwhile, the lithium second cell using the lithium iron phosphate material of the invention (the example 1) showed that the lithium iron phosphate cathodal material therein performed relatively better under high current discharge conditions than that illustrated in FIG. 10, as shown in the electrical chemistry analysis in FIG. 9, thereby increasing possible high powered product applications. The results also showed that the modified lithium iron phosphate cathodal materials provided better conductivity and allowed for better conduction of electrons therein and lithium ions to leave the lithium iron phosphate crystallines. Moreover, due to the porous structure, the modified lithium iron phosphate material provided more surfaces and increased more opportunity for intercalating or deintercalation of the lithium ions. This is good for operation of high current discharges.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cathodal material for lithium cells, comprising:
    a porous lithium metal oxide microparticle, comprising:
        a plurality of porous lithium metal oxide nanoparticles, wherein each of the porous lithium metal oxide nanoparticles comprises a plurality of nanocrystals of the lithium metal oxide and a first conductive layer provided between the plurality of nanocrystals of the lithium metal oxide, thereby forming a first three dimensional conductive network therein;
        a pore defined by connecting the lithium metal oxide nanoparticles;
        a second conductive layer covering at least a surface of one of the porous lithium metal oxide nanoparticles, contacting the first conductive layer, forming a second three-dimensional conductive network between the porous lithium metal oxide nanoparticles; and
        a conductive fiber connecting with the second conductive layer.

2. The cathodal material as claimed in claim 1, wherein the porous lithium metal oxide microparticle has an average diameter of 1-50 micrometers.

3. The cathodal material as claimed in claim 1, wherein the porous lithium metal oxide nanoparticles have an average diameter of 100-500 nanometers.

4. The cathodal material as claimed in claim 1, wherein the porous lithium metal oxide microparticle is formed with a porosity of 0.02-0.12 c.c./g.

5. The cathodal material as claimed in claim 1, wherein the porous lithium metal oxide nanoparticles are formed with a layered structure, a spinel structure, or an olivine structure.

6. The cathodal material as claimed in claim 1, wherein the porous lithium oxide nanoparticles are formed with a layered structure comprised of $LiCo_xNi_yMn_zO_2$, and wherein $x+y+z=1$.

7. The cathodal material as claimed in claim 1, wherein the porous lithium oxide nanoparticles are formed with a spinel structure comprised of $LiMn_2O_4$ or $LiTi_5O_8$.

8. The cathodal material as claimed in claim 1, wherein the nanocrystals of the lithium metal oxide are formed with an olivine structure comprising $LiFePO_4/C$, $LiFePO_4$, $Li_xM_{1-(d+t+q+r)}D_dT_tQ_qR_r(XO_4)$, wherein M is selected from the group consisting of Fe, Mn, Co, Ti, Ni and mixtures thereof, D is selected from the group consisting of $Mg^{2+}$, $Ni^{2+}$, $Co^{2+}$, $Zn^{2+}$, $Cu^{2+}$ and $Ti^{2+}$, T is selected from the group consisting of $Al^{3+}$, $Ti^{3+}$, $Cr^{3+}$, $Fe^{3+}$, $Mn^{3+}$, $Ga^{3+}$, $Zn^{3+}$ and $V^{3+}$, Q is selected from the group consisting of $Ti^{4+}$, $Ge^{4+}$, $Sn^{4+}$ and $V^{4+}$, R is selected from the group consisting of $V^{5+}$, $Nb^{5+}$ and $Ta^{5+}$, X is selected from the group consisting of Si, S, P, V and mixtures thereof, wherein $0 \leq x \leq 1$, $0 \leq d, t, q, r \leq 1$ and at least one of d,t,q and r has a value other than zero.

9. The cathodal material as claimed in claim 1, wherein the conductive fiber comprises metal, conductive organic materials or conductive inorganic materials.

10. The cathodal material as claimed in claim 1, wherein the first conductive layer is formed with a thickness of about 3-10 nanometers.

11. The cathodal material as claimed in claim 1, wherein the pore is an ordered or non-ordered open pore.

12. The cathodal material as claimed in claim 1, wherein the pore is formed with a size of about 10-30 nanometers.

13. A lithium secondary cell, comprising:
   a cathode, comprising the cathodal material as claimed in claim 1;
   an anode; and
   an ion-conducting layer sandwiched between the cathode and the anode.

* * * * *